(No Model.) 4 Sheets—Sheet 1.

U. THOMPSON.
ELECTRIC ALARM FOR HYDRANTS AND WATER MAINS.

No. 256,516. Patented Apr. 18, 1882.

WITNESSES:
William H. Hicks
Wm D Golden

Uldric Thompson
INVENTOR

BY A Sidney Deane
ATTORNEY (No Model.) 4 Sheets—Sheet 2.
U. THOMPSON.
ELECTRIC ALARM FOR HYDRANTS AND WATER MAINS.
No. 256,516. Patented Apr. 18, 1882.
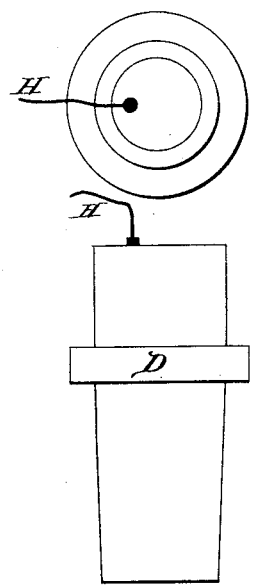
Fig. 2.
Fig. 3.
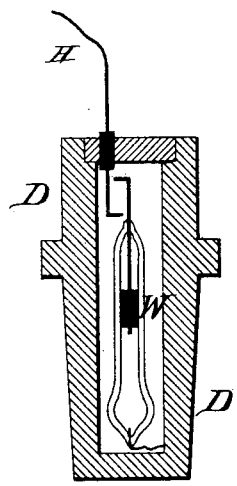
Fig. 4.
WITNESSES:
William H. Hicks
Wm D. Golden
Udric Thompson INVENTOR
BY A. Sidney Doane
ATTORNEY (No Model.) 4 Sheets—Sheet 3.

U. THOMPSON.
ELECTRIC ALARM FOR HYDRANTS AND WATER MAINS.

No. 256,516. Patented Apr. 18, 1882.

Witnesses: Uldric Thompson Inventor.
William H. Hicks
Wm D Golden
W. Sidney Evans
Attorney.

(No Model.) 4 Sheets—Sheet 4.

U. THOMPSON.
ELECTRIC ALARM FOR HYDRANTS AND WATER MAINS.

No. 256,516. Patented Apr. 18, 1882.

WITNESSES: Uldric Thompson INVENTOR

BY A. Sidney Brown
ATTORNEY

UNITED STATES PATENT OFFICE.

ULDRIC THOMPSON, OF CUTCHOGUE, ASSIGNOR OF ONE-HALF TO A. SIDNEY DOANE AND THOMAS H. RHODES, BOTH OF BROOKLYN, NEW YORK.

ELECTRIC ALARM FOR HYDRANTS AND WATER-MAINS.

SPECIFICATION forming part of Letters Patent No. 256,516, dated April 18, 1882.

Application filed November 4, 1881. (No model.)

*To all whom it may concern:*

Be it known that I, ULDRIC THOMPSON, of Cutchogue, Suffolk county, New York, have invented an Electric Alarm Attachment for Hydrants and Water-Mains, by which the freezing of water in the same is made known; and I do hereby declare that the following is a full, clear, and correct description of the same, reference being had to the accompanying drawings, making part of this specification, and to the letters of reference marked thereon, in which—

Figure 1:
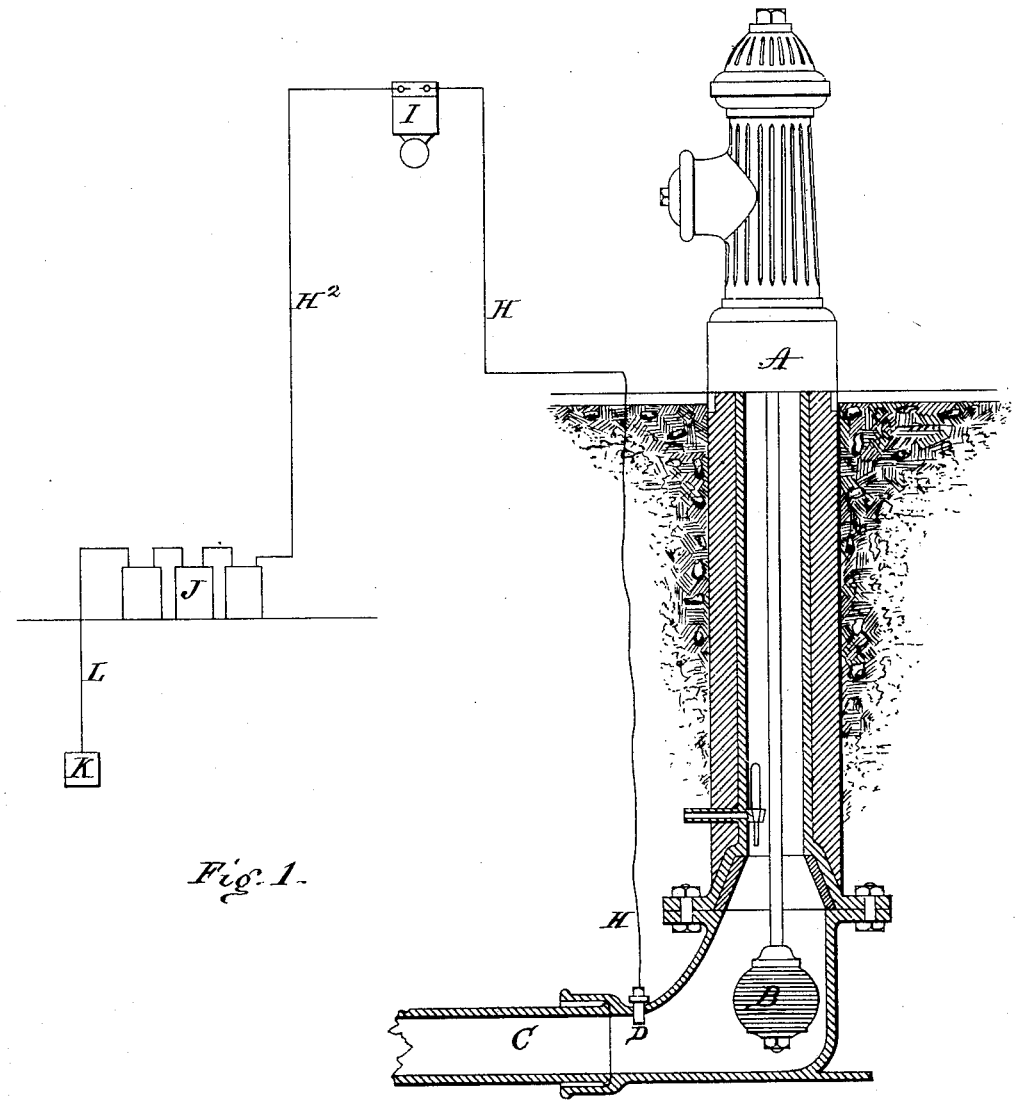
Figure 5:
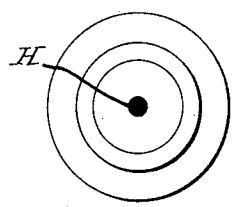
Figure 6:
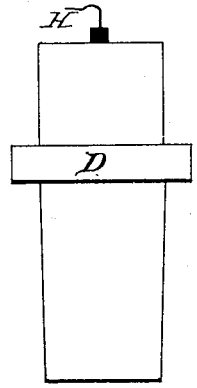
Figure 7:
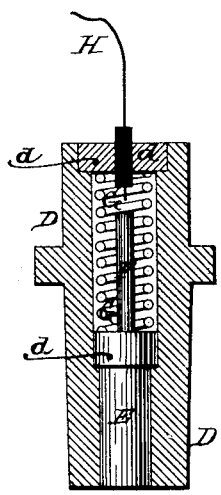
Figure 9:
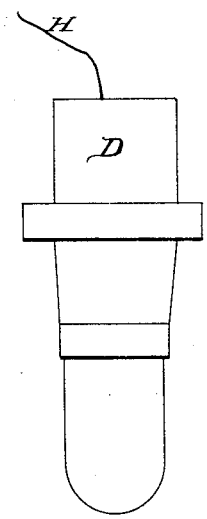
Figure 8:
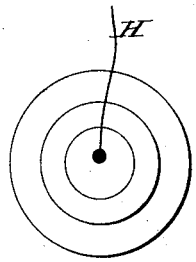
Figure 11:
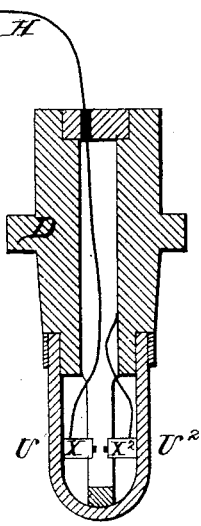
Figure 10:
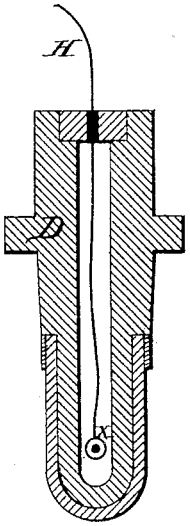

Figure 1 is a view of a hydrant to which my invention has been applied; Fig. 2, a top view of a modification of the invention; Fig. 3, a side view of a modification of the invention; Fig. 4, a sectional view of a modification of the invention, in which the thermostat is made use of; Fig. 5, a top view of the plug, case, or envelope usually employed. Fig. 6 is a side elevation of the plug, case, or envelope usually employed. Fig. 7 is a sectional view of the plug, case, or envelope usually employed. Fig. 8 is a top view of a modification of the invention. Fig. 3 is a side view of a modification of the invention; and Figs. 10 and 11 are sectional views of a modification of the invention.

In the drawings like parts of the invention are designated by the same letters of reference.

The nature of the present invention consists in the construction of an electric alarm device to be used in connection with a hydrant or water-main, by which the freezing of water in the same is made known, the object of the invention being, by the employment of this device in connection with a hydrant or water-main, to enable persons having charge of the same as soon as informed that the water has commenced to freeze in the same to proceed to thaw out the hydrant or water-main, and thus, so to speak, to re-establish the supply of water interrupted by the partial freezing of the water.

My invention has been made with a view to immediately inform the parties in charge of the fire-hydrants of a city that the water in the main of a hydrant is partially frozen as soon as such is the case; and for this purpose I make use of electric circuits, connecting each hydrant either to a central office or to the nearest engine-house in the district in which the hydrant is located, and thus as soon as the water commences to freeze in the hydrant an alarm will be sounded.

In carrying out my invention I have availed myself of the well-known fact that water in freezing expands, or that the ice formed occupies more space than the water occupied.

To enable those skilled in the art to make and use my invention, I will describe the same.

A shows a hydrant; B, the valve of the same; C, the main having connection with the street-main or water-supply pipe. I tap an opening into the main C of the hydrant, and introduce into the same a plug, case, or envelope, D. This plug, case, or envelope D is of the proper size and shape for the purpose intended, and is usually made of brass or other metal suitable for the purpose. It is bored through laterally, and closed at the top with hard rubber or other insulating material. It may be driven into the opening in the hydrant-main C, or have a screw-thread cut upon its exterior, engaging with a screw-thread cut upon the interior of the opening in the hydrant-main. When constructed as shown in Figs. 5, 6, and 7 of the drawings, a piston, E, fitting snugly within the plug, case, or envelope D, is used, the upper end or head of which is extended to form a rod, F, over which is passed a helical spring, G, retained in position by the sections $d$ of the plug, case, or envelope D.

H is a wire or spring, insulated with rubber or other suitable insulating material, placed in line with the piston E, and running from the plug, case, or envelope D to an alarm, I, at the central office or nearest engine-house. (See Fig. 1.)

J is an electric battery, and K is the ground-connection by means of the wire L.

$H^2$ is a wire extending from the alarm I to the battery J. The circuit is from the plug, case, or envelope D, by wire H, to the alarm I, thence by wire $H^2$ to the battery J, from battery J to the ground through wire L, and through the ground to the plug, case, or envelope D. Such being the construction, the operation is as follows: As soon as the water in the hydrant-main C begins to freeze the ice formed acts upon the piston E, forcing the same up, compressing the helical spring G, and as contact is established between the upper portion of the piston E or the rod F and the wire or spring H connection is formed between the hydrant A and the alarm I, and an alarm is sounded at the central office or nearest engine-house with which the hydrant is connected.

In Fig. 4 a modification of the invention is shown, in which the thermostat is employed. In this case the mercury acts as the ground-conductor through the plug, case, or envelope D. The thermostat is set normally at 32° Fahrenheit—the point at which water will freeze. As the mercury falls the float or piston W descends with it until it reaches the predetermined degree of temperature, when the spring placed above the glass tube containing the mercury will be brought into contact with the spring having electrical connection with the mercury, thereby completing the circuit and sounding the alarm.

In Figs. 8, 9, 10, and 11 a further modification of the invention is shown, in which the plug, case, or envelope D has attached to its base side pieces, V V$^2$, formed of rubber or some elastic material, and constituting a hood. Within the plug, case, or envelope D are placed the flat brass springs X X$^2$, covered with platinum, connected by wires, as shown. As the water freezes the ice compresses the sides V V$^2$, the connection is closed, and an alarm sounded, as already described. The other two sides of the plug, case, or envelope D are made of metal, preferably brass, and are faced in the direction whence the water flows.

While my invention will be found particularly valuable in connection with fire-hydrants in large cities, it can easily be used in private houses to notify the occupant of the fact of the freezing of the water in the supply-pipe leading to the house, or it may be placed in a reservoir located in the upper part of a building.

I have shown three separate ways in which my invention can be carried out, and described particularly that which seems to me the most feasible and economical.

The attachment, whatever be its special construction, is rigidly attached in the hydrant or main, so that its movable part or circuit-closer can be affected by the expansion of water in freezing. The plug, casing, or envelope is made hollow, but at the same time water-tight, so that while the contained movable circuit-closer is affected by the freezing the latter cannot by any possibility clog the action of the closer. Electric alarm attachments have been used before, notably in tanks to indicate when they are full, and in low-water gages in boilers; but these devices differ from the present one very materially, in that they would become clogged by freezing and not be caused to move.

What I claim as my invention, and desire to secure by Letters Patent, is—

1. As an electric alarm attachment for hydrants and water-mains to indicate freezing therein, the plug, case, or envelope D, hollow and water-tight, and provided with a movable circuit-closer, whereby the expansion of the water in freezing will close the circuit, but will not clog the closer, as set forth.

2. In combination with a hydrant or main and an alarm, battery, and their wires, a plug, case, or envelope, D, hollow and water-tight, and provided with a movable circuit-closer, whereby the expansion of the water in freezing will close the circuit and give the alarm, as set forth.

3. In combination with a hydrant or main and an alarm, battery, and their wires, the plug D, hollow and water-tight, and provided with the piston E, whereby the expansion of the water in freezing will close the circuit and give the alarm, all as set forth and described.

ULDRIC THOMPSON.

In presence of—
J. G. TUTHILL,
H. H. TUTHILL.